C. E. & W. H. JONES.
Telephone Exchange System and Furniture.

No. 234,192.      Patented Nov. 9, 1880.

WITNESSES:         INVENTORS
W H Beardsley      Charles E. Jones
Ira S. Millikin    William H. Jones
                   by James W. See
                              ATTORNEY 6 Sheets—Sheet 2.

C. E. & W. H. JONES.
Telephone Exchange System and Furniture.

No. 234,192. Patented Nov. 9, 1880.

WITNESSES:
W H Beardsley
Ira S. Millikin

Charles E. Jones
William H. Jones
by James W. See

INVENTORS

ATTORNEY

6 Sheets—Sheet 4.

C. E. & W. H. JONES.
Telephone Exchange System and Furniture.

No. 234,192.  Patented Nov. 9, 1880.

WITNESSES:  
W. N. Beardsley  
Ida S. Millikin

Charles E. Jones   INVENTORS  
William H. Jones  
by James W. See   ATTORNEY

C. E. & W. H. JONES.
Telephone Exchange System and Furniture.

No. 234,192.  Patented Nov. 9, 1880.

6 Sheets—Sheet 5.

WITNESSES:
W. H. Beardsley
Ira S. Millikin

INVENTORS
Charles E. Jones
William H. Jones
by James W. See,
ATTORNEY

6 Sheets—Sheet 6.

C. E. & W. H. JONES.
Telephone Exchange System and Furniture.

No. 234,192. Patented Nov. 9, 1880.

WITNESSES:
W N Beardsley
Ira S Millikin

Charles E. Jones
William H. Jones
by James W. See
INVENTORS
ATTORNEY

N. PETERS, PHOTO-LITHOGRAPHER, WASHINGTON, D C.

UNITED STATES PATENT OFFICE.

CHARLES E. JONES AND WILLIAM H. JONES, OF CINCINNATI, OHIO.

TELEPHONE-EXCHANGE SYSTEM AND FURNITURE.

SPECIFICATION forming part of Letters Patent No. 234,192, dated November 9, 1880.

Application filed August 1, 1879.

*To all whom it may concern:*

Be it known that we, CHARLES E. JONES and WILLIAM H. JONES, both of Cincinnati, Hamilton county, Ohio, have invented certain new and useful Improvements in Telephone-Exchange Systems and Apparatus, of which the following is a specification.

Our invention pertains to the mechanism and circuits of the operator's furniture in telephone-exchanges, and to a system of transfer or connection between tables where the lines entering an exchange are divided into groups which are placed on separate tables or desks.

Figure 1:
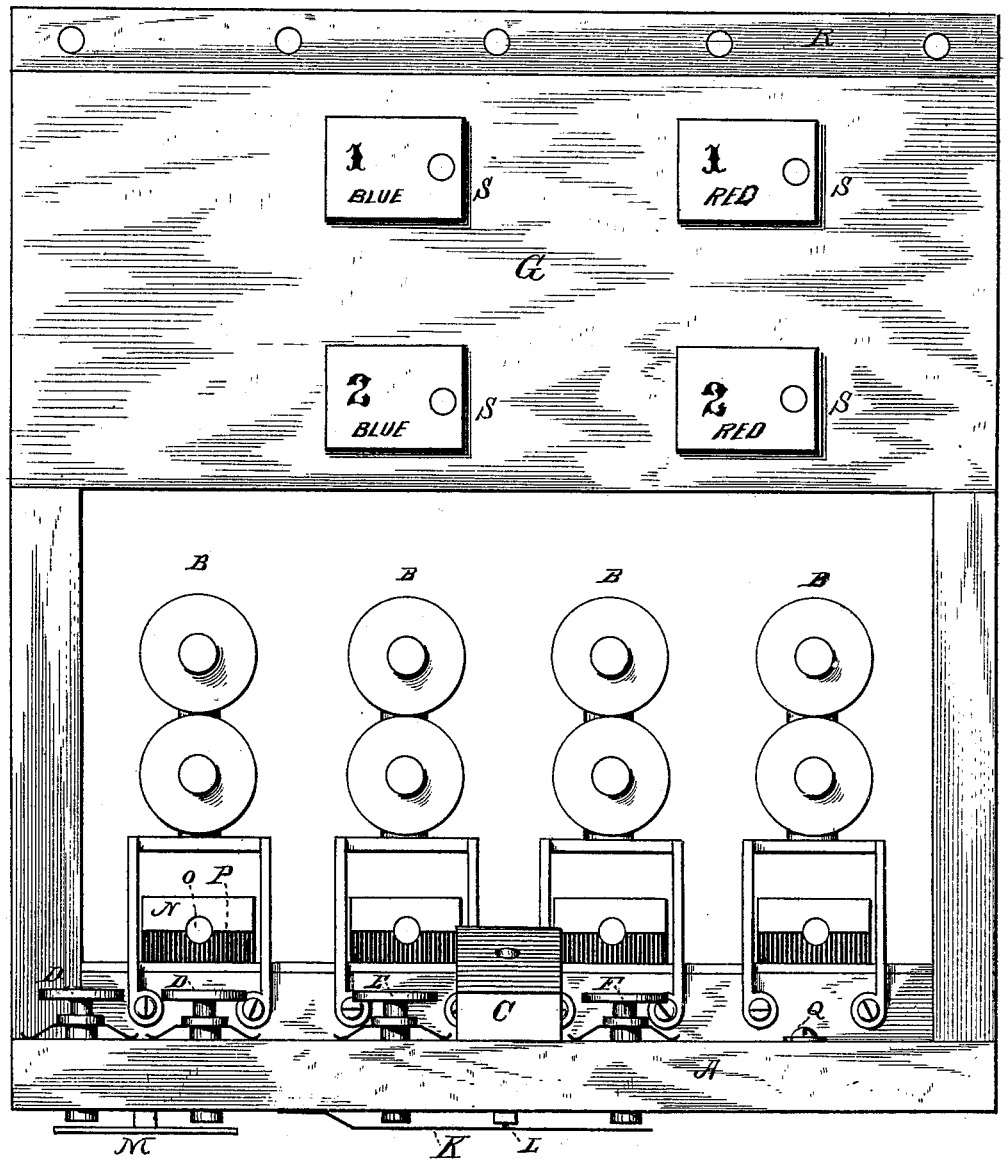
Figure 2:
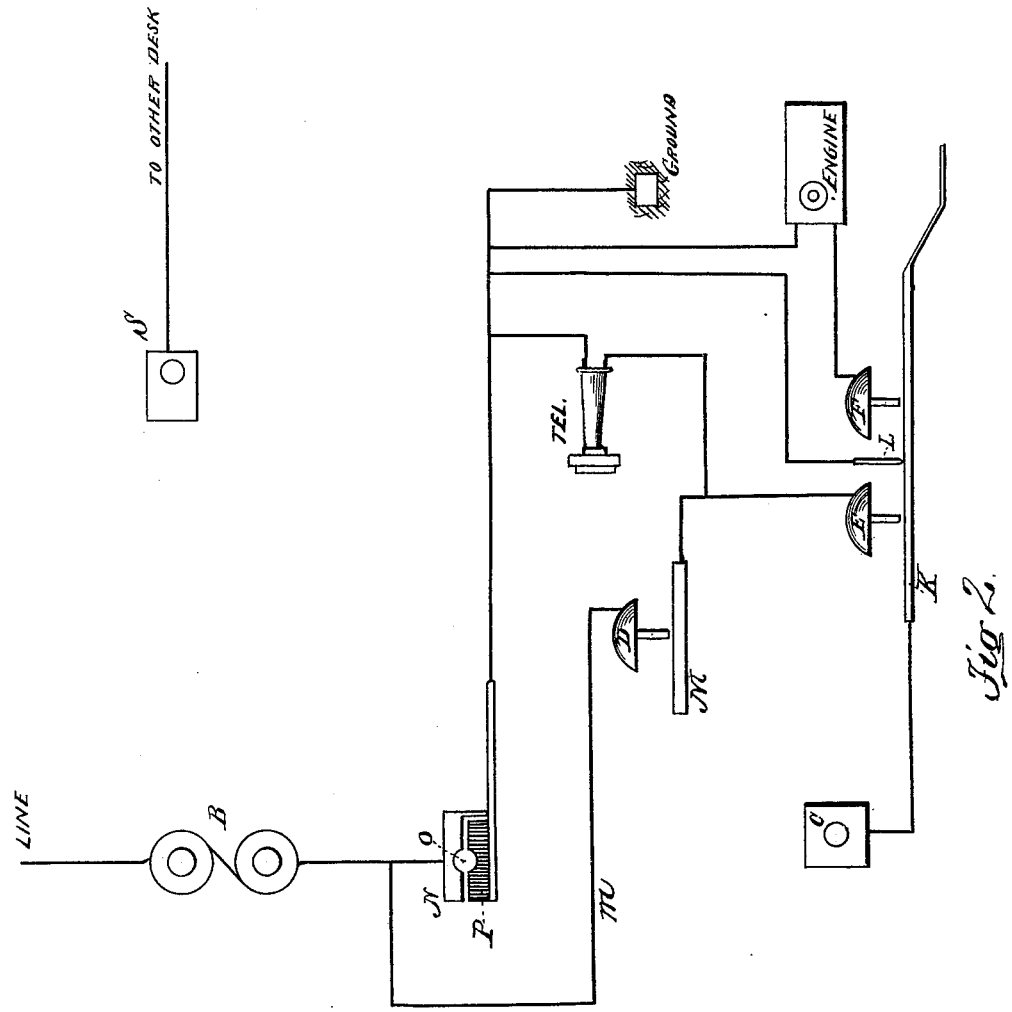
Figure 3:
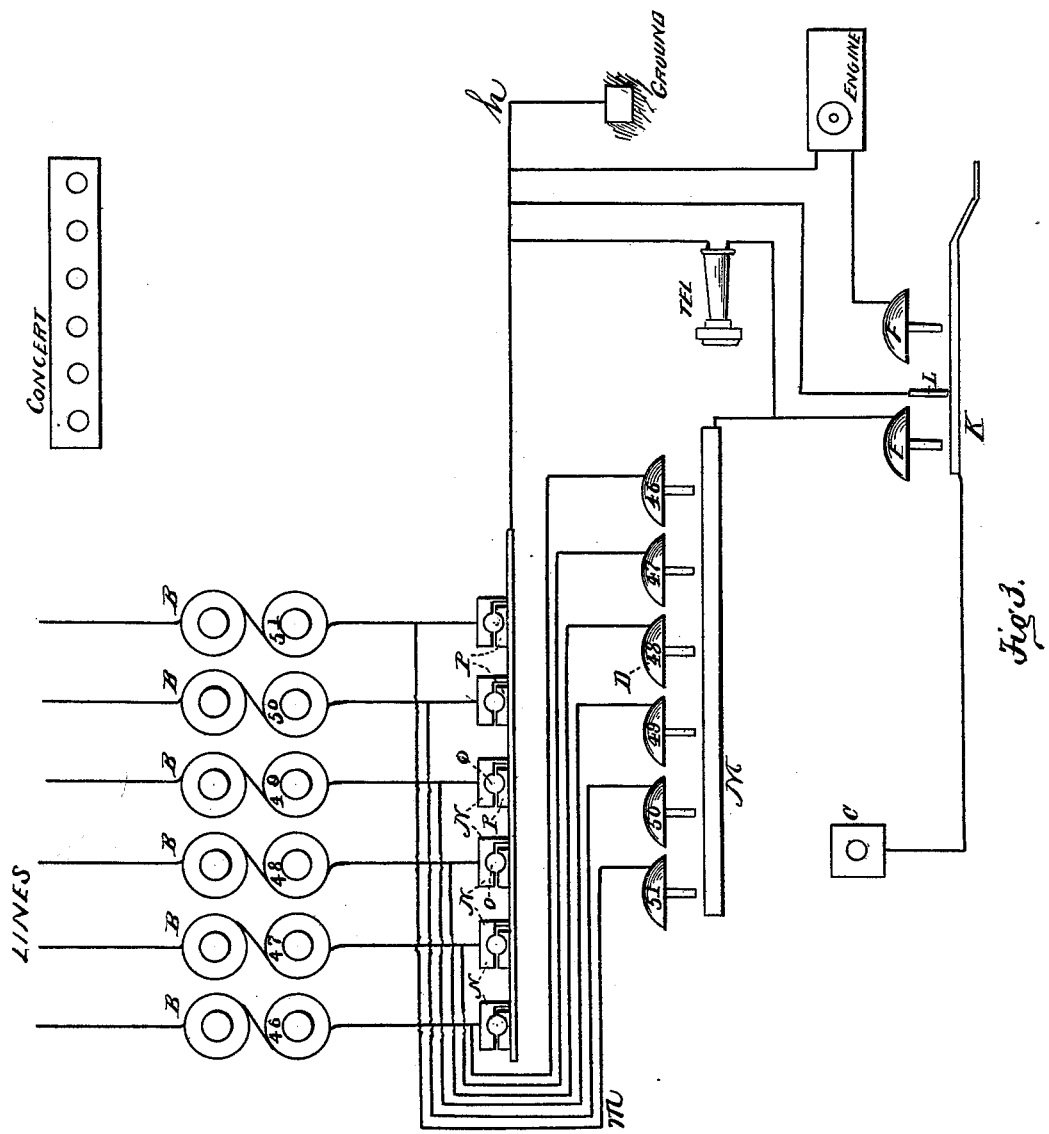
Figure 4:
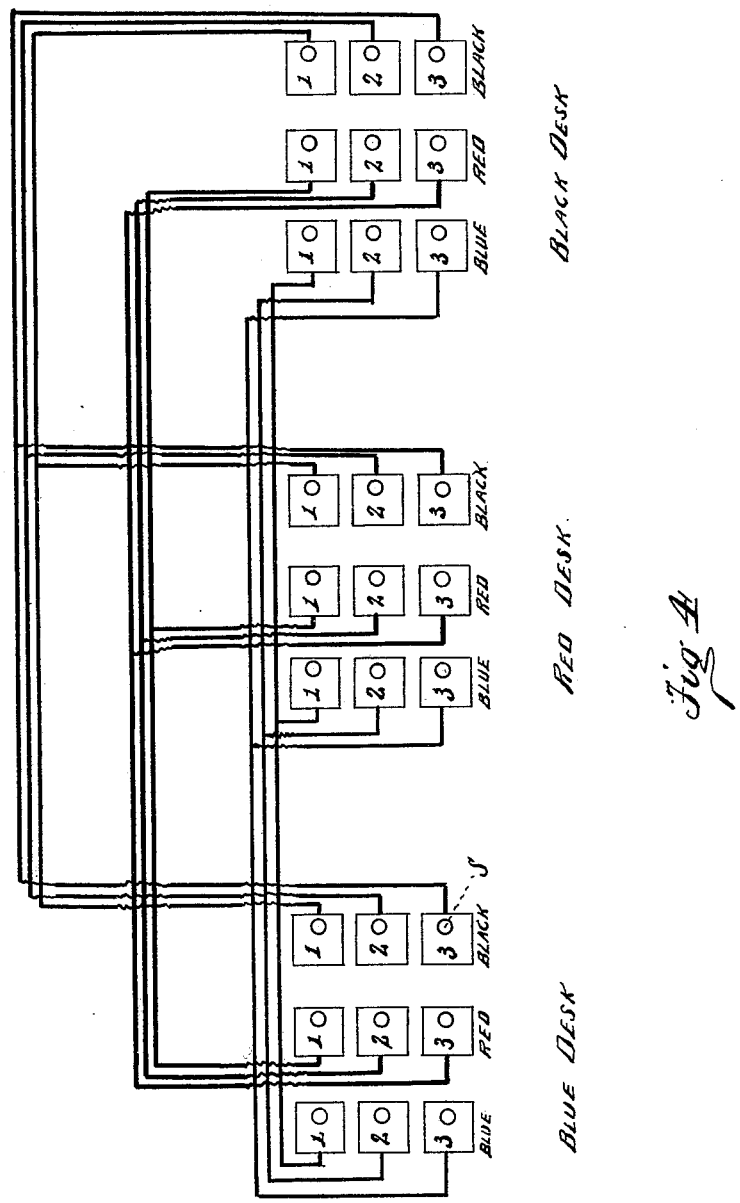
Figure 5:
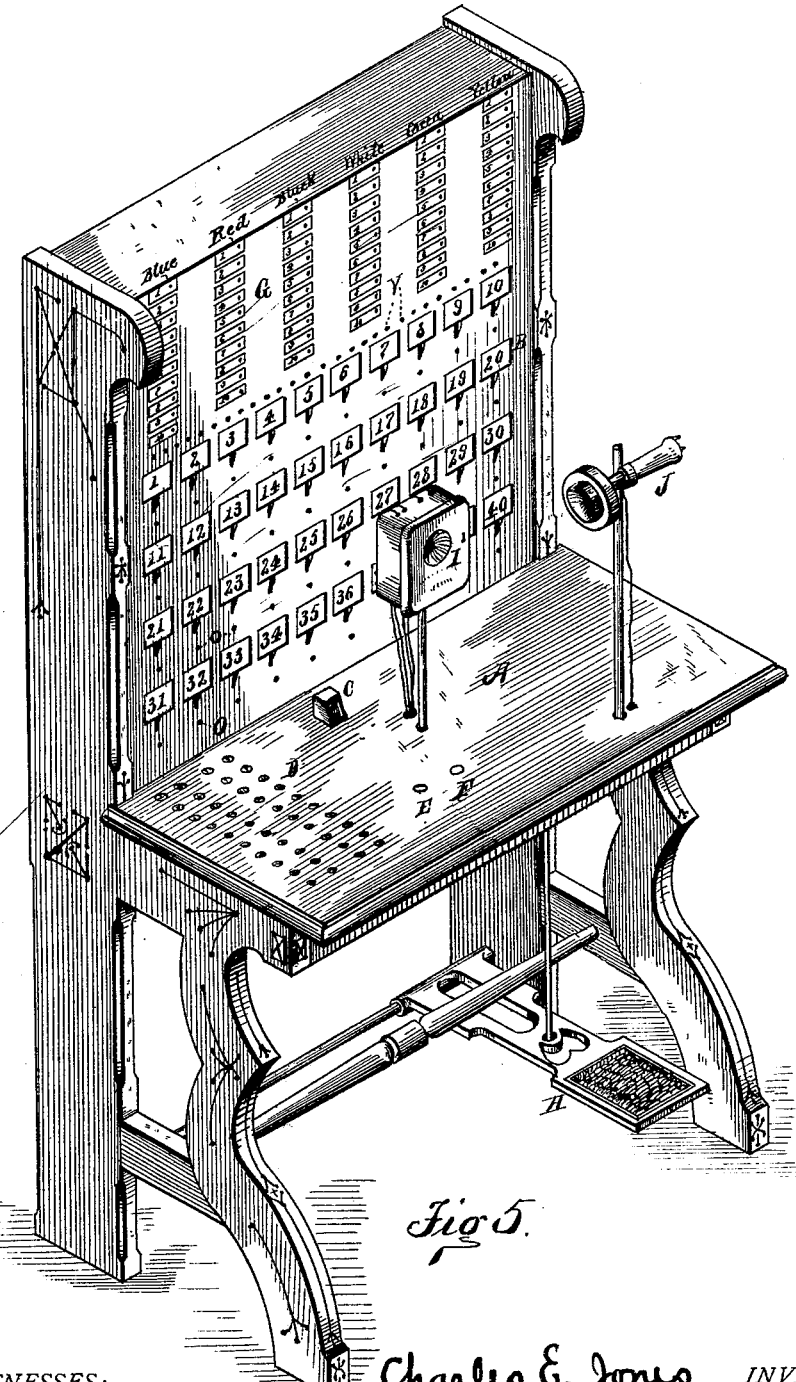

In the accompanying drawings, Figure 1 is a front elevation of a model exchange-desk; Fig. 2, a diagram showing the relation borne by one incoming line to the general instruments of the desk; Fig. 3, a diagram similar to Fig. 2, but involving six incoming lines; Fig. 4, a diagram illustrating the transfer-connections between desks; Fig. 5, a perspective view of a complete desk, and Fig. 6 a side elevation of our improved spring-jack attached to an annunciator or drop.

Before going into details we will give a general description of our devices and their mode of operation.

Fig. 5 shows, in perspective, an exchange-desk adapted to receive forty lines.

B are the annunciators or drops, and O are the spring-jack sockets for receiving the plug end of a flexible conductor.

We arrange our spring-jack so as to be operated by a plain round plug instead of the usual wedge, which required to be inserted in a certain way. Plugging a cord to one of the spring-jacks O lifts the jack, breaks the ground-contact, and diverts the circuit to the cord.

C is a metal socket fixed to the table A. The same cord ends used for the spring-jacks will fit this socket. A generator fixed under the table may be worked by the treadle H.

I is the transmitter, and J is the telephone.

If a subscriber calls, a plug-ended cord is inserted in his spring-jack, the other end of the cord being plugged to the socket C. This brings the subscriber's circuit to the socket C, and thence to ground. The operator depresses button F, which switches the circuit through the generator while he works the treadle and answers the call. He then depresses button E, which switches the circuit to the telephone and transmitter. He talks with the party, and upon being informed who is wanted he moves the cord-plug from the caller's spring-jack to the spring-jack of the wanted party. He now presses button F, thus calling the party, and upon receiving response he moves the cord-plug from the socket C to the spring-jack of the party who called, thus connecting the two parties.

At D is a group of numbered push-buttons, one for each line. Pressing upon the proper button will tap the operator's telephone to the circuit of two conversing subscribers, and thus enable him to listen or converse with them.

At V is a row of connected sockets, which will fit the cord-plugs. W is a concert-strip, and as many subscribers as desired may be connected to it, so as to hold concerted conversation or listen to music.

G is the transfer-board, which contains groups of plug-sockets fitting the cord-plugs. These sockets are connected with such other tables or desks as there may be in the exchange. One group of these transfer-sockets is used by the operator to send transfers to, and the other groups are to receive transfers from other desks. If the operator gets a call for a subscriber in another group upon another desk, he plugs the caller to a socket in his sending group of transfer-sockets and sends a ticket or note to the table who has the party wanted. The operator who receives the ticket calls the wanted party and plugs him to the proper transfer-socket on his table and the parties are connected.

The concert-strip V may also be plugged to the transfer-board, so that a concert need not be limited to the subscribers in one group on one desk.

The form of the annunciator or drop is immaterial. Any of the well-known forms may be used.

In Fig. 2, B is the electro-magnet of one of the drops. The line passes through the spools of the electro-magnet, and the circuit goes thence to the spring-jack N, and thence to ground, as shown in the diagram.

C represents the table-socket, and if a conducting-cord be plugged to this socket and to the spring-jack, the circuit will be broken at the spring-jack and diverted through the cord to the socket, and thence by wire to spring K, thence by contact L to ground, as shown. If the button F be depressed the contact at L will open and the circuit will go to ground through the generating-engine, as shown. If the button E be pressed, the circuit will be to ground through the telephone. If the listening-button D be pressed, the tap-wire $m$ will be put to ground through the telephone.

When two subscribers are connected by cord, either of their listening-buttons D may be pressed, thus tapping a third ground connection, including a telephone, onto the circuit, and enabling the operator to listen without in any way breaking their circuit. The contact L must be present in the table-circuit in order that a subscriber may answer a call while he is corded to the table-socket.

The spring-jack N contacts upon a metal plate, as shown. P is an insulating-abutment. A plain uninsulated plug may thus be used upon the cords instead of the usual insulated wedges.

Fig. 3 is substantially like Fig. 2, except that six lines, &c., are shown. The listening-buttons D form the open terminals of their tap-wires, and any of them may be depressed to contact upon the plate M, which is to ground through the telephone.

Figure 6:
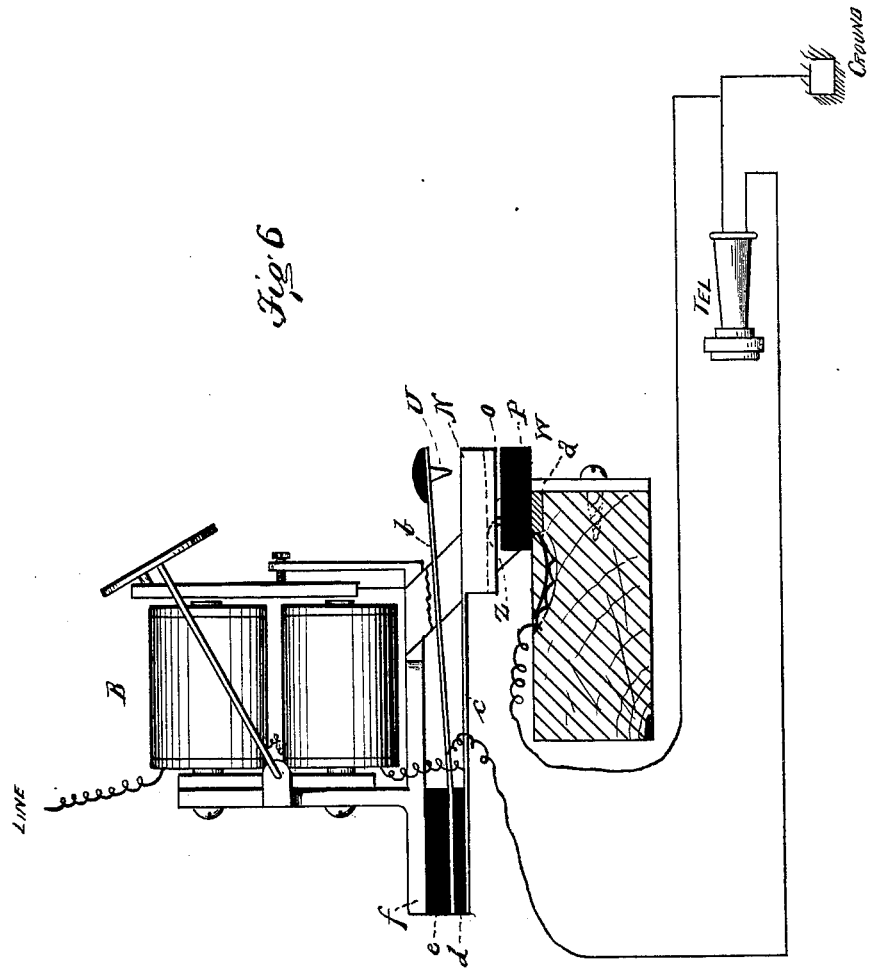

Fig. 6 shows an annunciator-drop having our improved spring-jack N fastened directly to its frame, but insulated from it by the insulating-blocks $c$ $d$. $d$ is the ground-strip, on which the spring-jack contacts, as usual, and P is the insulating-abutment before referred to.

In order to save wiring, it might be desirable to place the listening-keys close to the drops, and we show in this figure how we accomplish this.

In Fig. 6, B represents the drop-coils, and N the spring-jack. The line, as shown, goes through coils, thence, as usual, to the spring-jack N, thence by the usual spring-jack contact to earth. Above the spring-jack N is arranged the spring-key $b$, insulated from all the metal of the drop-frame and from the spring-jack. By means of wiring, as shown, the spring $b$ forms the open terminal of a grounded line, which includes a telephone in circuit. The spring $b$ is adapted, by finger-pressure on the end of it, to contact on the spring-jack, and thus tap the telephone onto the line-circuit. When two lines are corded together either of their listening-keys may be used.

We have shown and described all of the cord-end receiving devices as adapted to receive a plain round plug; but it is obvious that such receiving devices might be formed to receive any of the usual cord-tips, wedges, &c.

We now proceed to explain our peculiar system of transfer between tables. Assume that there are three tables in the exchange. We name them "blue desk," "red desk," and "black desk."

Fig. 4 shows the transfer-sockets of the three desks. There are nine sockets in the drawings for each desk, and all the sockets occupying corresponding positions on the drawings are connected by wire. Thus the lower left-hand sockets of all the tables are connected, &c. Assume that blue desk gets a call for a party not on his table. He may plug the party to the lower left socket and write a ticket thus: "Riley wants Ferguson, lower left." A ticket-boy goes to the red desk. Red desk calls Ferguson and plugs him to lower left socket on his board, and the connection is perfect and complete. Now suppose that in a few minutes black desk gets a call for some subscriber not in the black group. Where or to what socket can he plug the caller with any certainty that the transfer-wire is not already in use? He is not able to see all over the exchange, and, as far as his own transfer-board is concerned, all the sockets are vacant; but still we know that there is a transfer-connection at present on the "lower left."

The sockets we show in the drawings are precisely, as far as function is concerned, like nine continuous switch-strips from table to table, and the trouble with all transfer methods has been that one desk would have no means of knowing what connections were vacant. In an exchange with ten or twenty tables the question becomes a grave one—so grave, in fact, as to throw doubt on the practicability of the table-system of operations. By our invention the question is cleared at once, and we are enabled to make certain and reliable transfers between tables, no matter how many tables or how they are placed with reference to each other.

We divide the transfer-sockets on each board into groups, as many groups as there are desks, and color or configure each group, so that it may be identified. Each table thus has a group of blue sockets, a group of red sockets, and a group of black sockets. The sockets of each group are numbered to correspond, so that all identical sockets, as to number and color, are connected, as shown. In this way every socket is in permanent connection with every other socket of the same number and color or configuration. The blue sockets are solely for the use of transfers from the blue table, the reds for the red table, &c. Blue desk plugs its transfers to a vacant blue socket, and sends ticket giving color and number. He may use blue tickets, and thus indicate the color without noting it. He always plugs his transfers to blue sockets, and no other desk uses blue sockets except on orders from the blue desk. An operator may thus know to a certainty which socket may be used, because if his sockets are not plugged at his desk they are vacant. Each operator thus sends transfers to his own sockets and receives transfers from others on orders from the operators controlling them.

In Fig. 4 there are provision for three transfers from each table. In practice we provide for ten transfers from each table by putting on each table as many groups of ten sockets as there are tables in the system.

In Fig. 5 the transfer-board is fitted for use in a six-desk exchange.

Instead of various colors on the sockets they may be differently shaped, and we may thus have a heart-table, a spade-table, a diamond-table, &c.; or the transfer-sockets may be configured or marked in any way, so that the groups may be classed and identified and described by ticket.

As previously stated, the plug-sockets are simply a means of receiving connections from lines, and any other form of connection-receivers may be used in their place, so long as they are adapted to connect with the lines upon the tables.

We desire to add that we disclaim as our invention the division and arrangement of subscribers' lines upon separate desks provided with complete apparatus for serving and connecting the subscribers which may be grouped together, combined with open connecting-wires between desks, to be used in case one desk should find it necessary to connect with another group.

The peculiarity of our transfer system has been fully set forth, and it is applicable to almost any table system of operation.

We make no claim to the relative location of drops and spring-jacks. The location of spring-jacks under or close to annunciator-drops, so that when an annunciator is operated it will show perfectly the spring-jack with which it is connected, is old, and forms no part of our invention. We disclaim it.

We claim as our invention—

1. In a telephone-exchange system in which subscribers' lines are divided into groups upon separate desks, the arrangement upon the transfer-board of each desk of as many differently colored or configured plug-sockets or equivalent connectors as there are groups in the system, each plug-socket being in permanent connection with all other similarly colored or configured sockets, substantially as and for the purpose specified.

2. In a telephone-exchange system having subscribers' lines arranged in groups on separate desks, the arrangement of as many numbered series of similarly colored or configured plug-sockets or similar connectors as there are groups in the system, each plug-socket being in permanent connection with every other socket of the same number and color or configuration, substantially as set forth.

3. In a telephone-exchange desk, the combination, with the group of signal devices B and spring-sockets O, of the socket C, or equivalent connector, the socket being normally one terminal of a line including a telephone, or a generator, or both, or a switch, by means of which it may, at pleasure, be made to include them, substantially as set forth.

4. In a telephone-exchange desk, the combination, with the socket C, or an equivalent connector, of a normal ground-contact, L, and a switch, F, arranged to break said contact and substitute a connection including a generator, a telephone, or both, substantially as set forth.

5. In a telephone-exchange system, the tap-wires $m$, permanently connected with the incoming lines at a point beyond the spring-jacks, normally open, but provided with finger-keys, by which they may be put to ground through a telephone, substantially as set forth.

6. In a telephone-exchange desk, the plate M, always to ground through a telephone, combined with a group of push-buttons, forming the terminals of open tap-wires permanently connected with the subscribers' lines outside the spring-jacks, substantially as set forth.

7. In a telephone-exchange desk, the combination, with the group of signal devices B, spring-sockets O, and an operating-table provided with apparatus for signaling and conversation, of the terminal socket C, or equivalent connector, adapted to receive or connect with a cord end which will also fit the spring-sockets O, whereby the same cord which is used to connect the spring-socket with the table-socket may also be used to connect two spring-sockets, substantially as set forth.

8. In a telephone-exchange desk, the combination, with the transfer-board G, of the group of spring-sockets O and the concert-strip V, substantially as set forth.

9. In telephone-exchange furniture, the spring-jack N, arranged to be lifted by means of a round plug inserted between it and an insulating-abutment, P, substantially as specified.

10. In telephone-exchange furniture, the annunciator-drop frame $f$, having attached to it, but insulated from it, the spring-jack N, substantially as specified.

11. In telephone-exchange furniture, the spring-jack N, having attached to it, but insulated from it, the contacting finger-spring G, normally open, substantially as set forth.

CHARLES E. JONES.
WILLIAM H. JONES.

Witnesses:
J. W. SEE,
THOS. COPE.